United States Patent [19]

Hughes

[11] Patent Number: 5,190,322
[45] Date of Patent: Mar. 2, 1993

[54] SEALING CUFF FOR BLOW MOLDED PLASTIC COMPONENTS

[76] Inventor: William E. Hughes, 40034 Fraser Dr., Sterling Heights, Mich. 48310

[21] Appl. No.: 756,095

[22] Filed: Sep. 6, 1991

[51] Int. Cl.⁵ ............................................. F16L 33/20
[52] U.S. Cl. .................................. 285/236; 285/253; 285/332; 285/330; 285/910
[58] Field of Search ............ 285/253, 236, 332, 334.1, 285/338, 330, 910

[56] References Cited

U.S. PATENT DOCUMENTS

| | | | |
|---|---|---|---|
| 2,315,897 | 4/1943 | Hansell | 285/253 X |
| 3,558,164 | 1/1971 | Havell | 285/236 |
| 3,572,774 | 3/1971 | Sipler | 285/253 |
| 3,756,631 | 9/1973 | Ross | 285/236 X |
| 4,643,465 | 2/1987 | Green et al. | 285/236 |
| 4,646,167 | 7/1989 | Tibbals | 285/236 X |
| 5,096,206 | 3/1992 | Andre et al. | 285/910 X |

FOREIGN PATENT DOCUMENTS 0009594 of 1906 United Kingdom ................ 285/236
2158173 11/1985 United Kingdom ................ 285/236

Primary Examiner—Randolph A. Reese
Assistant Examiner—Heather Chun
Attorney, Agent, or Firm—Kenneth H. MacLean, Jr.

[57] ABSTRACT

A cuff type air seal for sealing the overlap of partly telescoped parts that has an annular body of rubber or elastomer material having annular internal air sealing beads thereon which are adapted to fit on outer peripheral surfaces of the parts adjacent their overlap. Both parts have fixed outer diameters but the outer part may be a blow molded annular component having an internal diameter which varies so usually there is clearance and a potential air leak path at the overlap. An adjustable clamp encompasses the air seal and provides a constricting force so that the air sealing beads seal on the outer surfaces of the parts even though the clearance remains. The cuff is formed with a pocket that receives and retains a headed portion of the blow molded part when telescoped over the facing headed portion of the first part, particularly when the clamp is constricted.

2 Claims, 1 Drawing Sheet

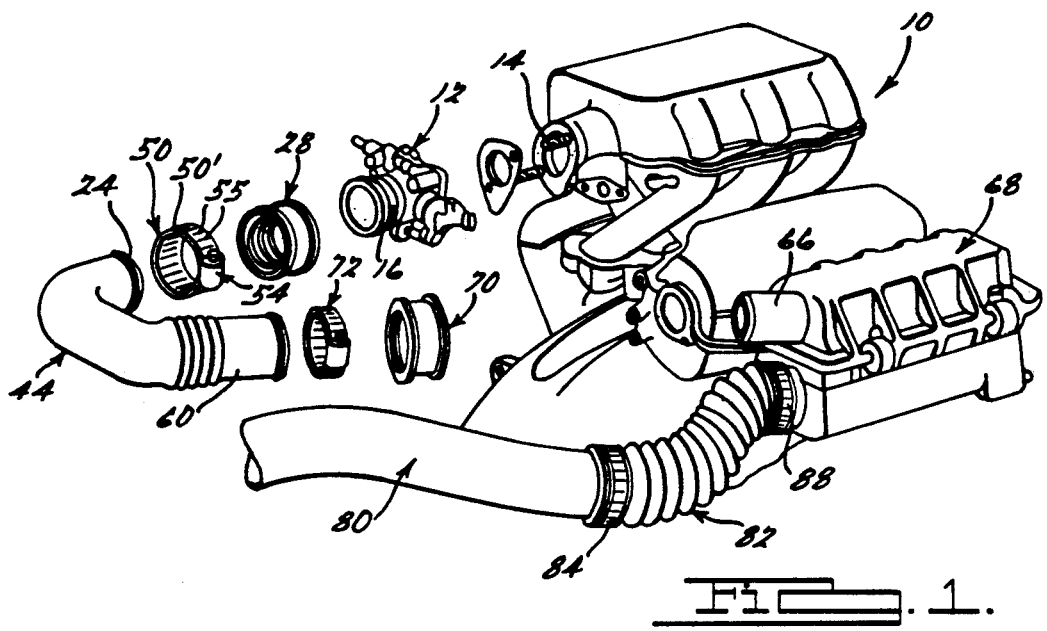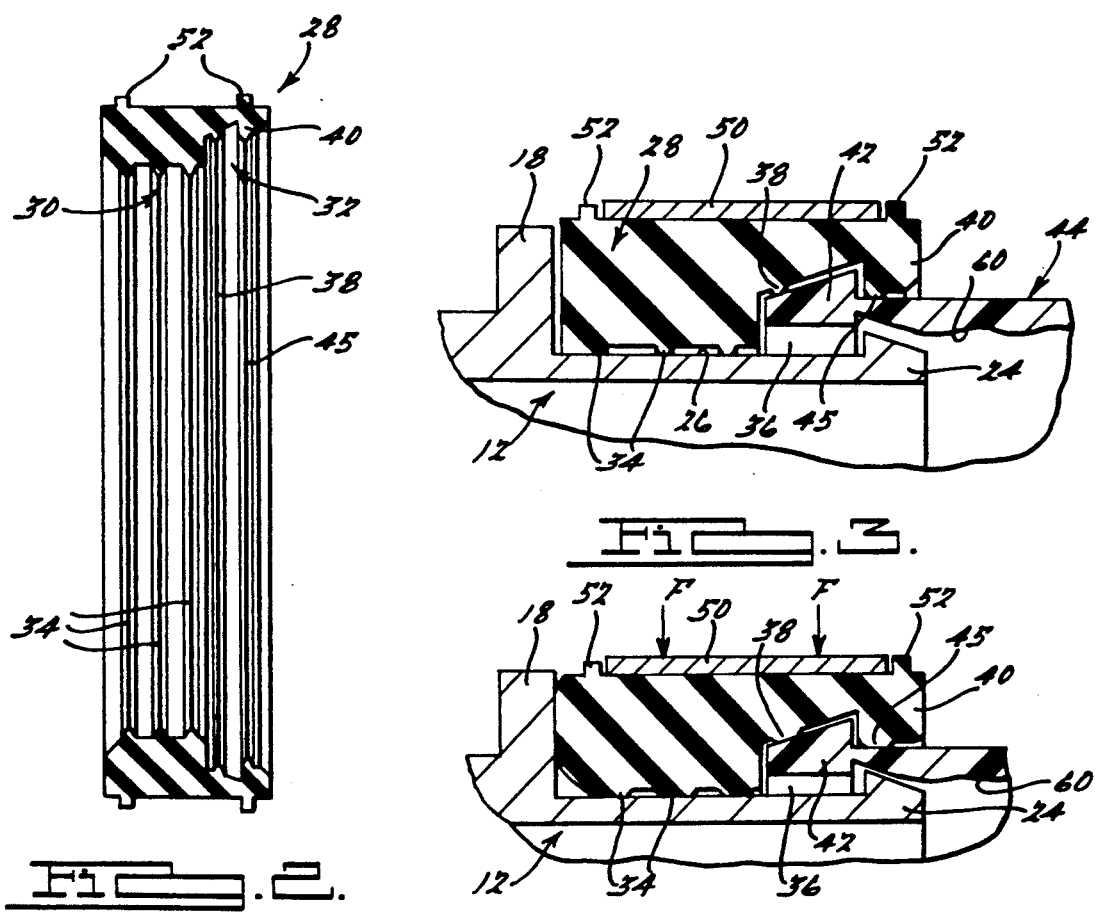

SEALING CUFF FOR BLOW MOLDED PLASTIC COMPONENTS

FIELD OF THE INVENTION

This invention relates to fluid sealing connectors, and more particularly, to a new and improved fluid sealing and clamping device for securely but releasable joining partly telescoped fluid conducting parts to one another at their overlap in a fluid tight manner even though there is clearance in the overlap.

SUMMARY OF THE INVENTION

In a preferred embodiment of this invention an effective fluid sealing and clamping device is provided which will readily accommodate blow molded, as well as other fluid conducting components, having a fixed outer diameter but whose internal diameter is irregular or varies over a wide range of measurements because of minimized control of internal diameters during blow molding or other manufacturing procedures.

In accordance with this invention, a resilient annular fluid sealing cuff of rubber or rubber like material is adapted to fit around first and second partially telescoped components to be clamped and fluid sealed together. This sealing is particularly effective since the cuff is formed with a series of axially spaced annular sealing beads that project inwardly from discrete internal diameter portion of the cuff for sealing contact with axially spaced outer peripheral portion of both of the telescoped components. In a preferred construction the sealing cuff has a truncated conical end socket that terminates in a radial end wall which forms the outboard end of a retainer pocket with an axial entryway that receives and retains the mating truncated conical head of the second component to be fluid sealed and clamped by the cuff of the sealing device.

The second component to be fluid sealed and connected to the first component can be a blow molded pipe of plastics material having a fixed outer diameter, but whose inner diameter varies since blow molding generally provides minimal control of the inner diameter. This pipe has a connector head formed as a truncated cone that is easily inserted over the oppositely facing truncated conical head of the first component and into the socket provided by the sealing cuff. During this assembly the radial retainer wall of the sealing cuff can resiliently deflect to allow for such insertions and recover to the position in which the head is trapped into the socket after insertion is completed. Effective air tight sealing is achieved by the use of a 360 degree constrictor clamping band which can be mechanically tightened to squeeze the cuff so that sealing beads formed internally therein are compressively loaded and bulge axially on the laterally spaced surfaces of the overlap that are contacted.

This invention has a wide range of application since it can readily employed to effect the mechanical connection and sealing of a component that telescopically fits over another component with a wide range of clearance therebetween. The fluid sealing is obtained even if large clearances remain between the overlap of the components after the clamp constricting the sealing cuff has been tightened to a selected diameter that assures sealing to the outside surfaces of the two components being sealed and connected together.

BRIEF DESCRIPTION OF THE DRAWINGS

FIG. 1 is an exploded view or a fuel injected internal combustion engine having air intake tubing operatively connected by the fluid seal and clamp device of this invention to a throttle body of the invention;

FIG. 2 is and enlarged cross sectional view of an annular sealing cuff forming a major component of this invention;

FIG. 3 is a portion of the fluid seal and clamp device incorporating the cuff of FIG. 2 before compression for fluid sealing; and FIG. 4 is a view similar to the view of FIG. 3 but with the clamping cuff constricted and compressively loaded for a fluid tight connection.

DESCRIPTION OF THE PREFERRED EMBODIMENTS

Turning now in greater detail to the drawings, there is shown in FIG. 1, a fuel-injected internal combustion engine 10 for a vehicle having a throttle body 12 adapted to be secured thereto by threaded fasteners 14. The throttle body 12 has a generally cylindrical neck 16 projecting outwardly therefrom and has an abutment flange 18 spaced from its terminal end defined by a truncated cone shaped head 24. The neck 16 further has a cylindrical seating surface 26 extending between the flange 18 and the tapered head 24, which provides a smooth annular surface for an annular sealing cuff 28.

The sealing cuff 28 is a generally cylindrical body of resilient rubber or a suitable elastomer generally having first and second stepped inner diameter portions 30 and 32. The first inner diameter portion 30 is dimensioned to be less than the inner diameter of the second portion 32. It is formed with a series of annular sealing beads 34 which are preferably dimensioned to make annular contact with the seating surface 26 of the throttle body when the sealing cuff is axially inserted over the tapered head 24 of the throttle body 12. This installation causes the radial outward deflection of the inboard end of the sealing cuff neck, but as shown in FIG. 3, the body of the cuff has recovered to its free or natural state and the sealing beads 34 which may be partly deflected or bulged in a preliminary sealing position by the force of recovery.

In addition to the internal annular beads 34, the larger internal diameter portion of the sealing cuff 28 provides a truncated conical socket 36 formed adjacent to the outboard end thereof. The socket 36 has an annular sealing bead 38 formed on the inclined wall thereof and extends radially inward, as best shown in FIG. 2. The outboard end of the cuff 28 has an inwardly extending outer wall 40 that defines the outer axial extent of the retainer.

As shown in FIG. 3, the sealing bead 38 of the socket is adapted to make sealing contact with the truncated conical head 42 forming the terminal end of a blow molded air pipe 44. Another annular sealing bead 45 projecting inward from the inner diameter of the outer radial wall 40 is adapted to contact and seal the outer diameter of the blow molded air pipe 44 immediately outboard of its conical head 42. These two beads effect the fluid sealing between the outer diameter of the pipe 44 and the cuff 28.

After the sealing cuff is installed on the throttle body, the blow molded pipe 44 is inserted in the cuff as shown in FIG. 3. A hose clamp 50 may be installed around the outer diameter of the sealing cuff 28 between annular laterally spaced locator ribs 52. This clamp has a worm screw 54 mounted in a saddle secured to one end of a belt-like strap of the clamp which drivingly engages parallel and equally spaced slots 55 in the strap 50' of the clamp. The strap is inserted through the saddle and the head of the worm can be turned with a screwdriver or a socket wrench to effect the compression loading of the cuff shown by force F in FIG. 4. This causes the fluid tight sealing and bulging of the sealing beads of the cuff on the engaged surfaces to effect the desired fluid sealing and clamping of the blow molded pipe and the throttle body as diagrammatically illustrated in FIG. 4. With the conical head 42 of the pipe entrapped in the pocket, the pipe cannot be axially separated from the throttle body since the retainer wall 40 and the conical head 24 will lock onto the conical head 42 of the pipe 44. With this connection and fluid sealing arrangement, the pipe and connected throttle body can conduct air to the engine without leakage and without physical separation.

The inlet end of the pipe 44 is fed with air from the air cleaner 68 exiting through a outlet neck 66 thereof which is connected and air sealed to the intake and the pipe by sealing cuff 70 and hose clamp 72 which may be like the cuff 28 and clamp 50 connecting the throttle body to the outlet end of the air supply pipe 44. The air cleaner outlet pipe or neck has truncated head that telescopically fits within the truncated head of the intake end of the pipe. This construction and the sealing of outer peripheral portions of the two parts at their overlap is substantially the same as the connection shown in FIGS. 3 and 4.

The air cleaner is supplied with air through an air intake pipe 80 which feeds air into the air cleaner 68 by a corrugated flexible pipe 82 secured to the outlet end of the air intake pipe 80 by hose clamp 84 and to the cylindrical intake fitting (below outlet neck 66) of the air cleaner 68 by a hose clamp 88.

With this invention, other modifications can be made employing the principles and teaching of the disclosure herein. It is therefore the intent of this specification to illustrate preferred embodiments of the invention, and the invention to be limited to the scope of the following claims.

I claim:

1. A clamping device for clamping fluid sealing first and second cylindrical parts having truncated conical head portions which are adapted to telescope over one another with clearance therebetween.

an annular cuff of resilient rubber-like material, said annular cuff having a first internal diameter portion for sealing engagement with the outside diameter of the first part and a second internal diameter portion for sealing engagement with the outer diameter of the second part, said cuff having a retainer pocket formed therein which receives the head portion of the second part and having an outer wall forming one end of said cuff to entrap said head portion of said second part therein when said cuff is inserted on said first part and said head portions are telescoped clamping means positioned around said cuff for exerting a constricting force to effect a fluid tight seal on the outer surfaces of said parts while clearance remains between said telescoped head portions.

2. The construction defined in claim 1, wherein said second part is a cylindrical pipe blow molded from plastics material which has a variable internal diameter and a fixed external diameter.

* * * * *

UNITED STATES PATENT AND TRADEMARK OFFICE
CERTIFICATE OF CORRECTION

PATENT NO. : 5,190,322
DATED : March 2, 1993
INVENTOR(S) : Hughes

It is certified that error appears in the above-indentified patent and that said Letters Patent is hereby corrected as shown below:

On title page, item [73] insert --Chrysler Corporation--

Signed and Sealed this

Fifth Day of July, 1994

Attest:

BRUCE LEHMAN

Attesting Officer    Commissioner of Patents and Trademarks